United States Patent
Shimizu (10) Patent No.: US 8,405,329 B2
(45) Date of Patent: Mar. 26, 2013

(54) MOTOR DRIVE CONTROLLER AND IMAGE FORMING APPARATUS INCORPORATING THE MOTOR DRIVE CONTROLLER

(75) Inventor: Fumihiro Shimizu, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 334 days.

(21) Appl. No.: 12/923,960

(22) Filed: Oct. 18, 2010

(65) Prior Publication Data
US 2011/0089874 A1    Apr. 21, 2011

(30) Foreign Application Priority Data
Oct. 19, 2009    (JP) ................. 2009-240277

(51) Int. Cl.
*H02P 6/16*    (2006.01)
(52) U.S. Cl. ......... 318/400.04; 318/400.01; 318/400.26; 318/700; 318/727; 318/767
(58) Field of Classification Search ........... 318/400.04, 318/400.01, 400.26, 700, 727, 767
See application file for complete search history.

(56) References Cited

U.S. PATENT DOCUMENTS

| | | | | |
|---|---|---|---|---|
| 5,650,779 A | * | 7/1997 | Sugden | ............ 341/9 |
| 7,301,333 B2 | * | 11/2007 | Kuwahara | ......... 324/207.25 |
| 2010/0117576 A1 | | 5/2010 | Shimizu | |

FOREIGN PATENT DOCUMENTS

| | | |
|---|---|---|
| JP | 3-500328 | 12/2003 |
| JP | 2008-236831 | 10/2008 |

OTHER PUBLICATIONS

Abstract of JP2001-037279, published on Feb. 9, 2001.

* cited by examiner

*Primary Examiner* — Walter Benson
*Assistant Examiner* — David Luo
(74) *Attorney, Agent, or Firm* — Harness, Dickey & Pierce, P.L.C.

(57) ABSTRACT

A motor drive controller includes a position detector that detects and outputs positional signals representing rotational positions of the magnetic rotor at first resolution, a position change detector that detects and outputs position change signals representing rotational positions of the magnetic rotor at second resolution higher than the first resolution, a phase synchronizing circuit that generates and outputs low resolution absolute phase information based on the positional and position change signals. The phase synchronizing circuit generates and outputs high-resolution absolute phase information based on the position change signals. A drive voltage signal outputting device outputs a drive voltage signal causing the current to flow through the coils in accordance with the absolute phase information.

15 Claims, 9 Drawing Sheets

MOTOR DRIVE CONTROLLER AND IMAGE FORMING APPARATUS INCORPORATING THE MOTOR DRIVE CONTROLLER

CROSS-REFERENCE TO RELATED APPLICATIONS

This application claims priority pursuant to 35 USC §119 to Japanese Patent Application No. 2009-240277, filed on Oct. 19, 2009, the entire contents of which are hereby incorporated by reference herein.

BACKGROUND OF THE INVENTION

1. Field of the Invention

The present invention relates to a motor drive controller capable of controlling rotary driving of a motor having coils of plural phases and an image forming apparatus incorporating the motor drive controller.

2. Discussion of the Background Art

In various fields, such as home appliances, office instruments, car electric generators, etc., non-brush motors are widely used. For example, a non-brush motor having coils of three phases arranged at phase intervals of 120 degrees is known that is equipped with a position detector to output positional signals that represent positions of a rotor by changing a signal level at every electrical angle of 60 degrees, and witch employs rectangular wave driving that sends a particular rectangular wave current to a prescribed phase through an electrical angle of 120 degrees in accordance with the positional signal. The position detector generally includes three hall ICs, arranged so that the signal level of a positional change signal changes at every electrical angle of 60 degrees.

As a system to resolve problems of noise and vibration caused in rectangular wave driving, a sine wave driving system is known in that a sine wave current is flown through three-phase coils to rotate and drive a rotor in accordance with a position of the magnetic rotor. However, in order to flow the sine wave current, the rotational position of the magnetic rotor needs to be detected with a high resolution. Thus, a high-resolution encoder is necessarily arranged on a rotation shaft of the motor, thereby increasing cost.

By contrast, an inverter system described in Japanese Patent No. 3500328 includes a position detector that detects and outputs a cyclically changing positional signal in accordance with a position of a rotor, a pulse generation circuit that generates clock pulses having a frequency multiplied in accordance with a cycle of change in the positional signal, and a phase presumption circuit that counts clock pulses with reference to a changing point of the positional signal and predicts a rotational position of the magnetic rotor. Japanese Patent No. 3500328 further includes an inverter circuit that outputs a sine wave current in accordance with the predicted rotation phase. Thus, the non-brush motor is controlled by the sine wave driving system suppressing noise and vibration while omitting the expensive high-resolution encoder.

However, a position detector, such as a Hall IC, etc., constituting the position detector is susceptible to error in positioning due to reflow mounting onto a print substrate. If a changing point of the positional signal is erroneous due to the arrangement error of the position detector, a changing cycle of the positional signal is also erroneous. Thus, when a difference of a positional signal changing cycle varies per cycle, a difference of a frequency of clock pulses also varies when generated per cycle of the phase signal. Accordingly, when it is generated using such pulses, the sine wave discontinuously deforms or distorts, thereby likely causing unevenness of rotation and noise.

Japanese Patent Application Laid Open No. 2008-236831 (JP-2008-236831-A) proposes a motor drive control apparatus that includes a position detector that detects and outputs a cyclically changing positional signal in accordance with a position of a rotor, an absolute phase information outputting device that smoothens the positional signal and outputs absolute phase information based on the positional signal, and an inverter circuit that outputs a sine wave current in accordance with the absolute phase information. Specifically, the non-brush motor is controlled by the sine wave driving system suppressing noise and vibration while reducing the impact of any error occurring at the changing point of the positional signal due to arrangement error of the position detector.

However, since the motor control apparatus of JP-2008-236831-A generates the absolute phase information of the magnetic rotor by smoothening the difference of the positional signal caused by the arrangement error of the position detector (e.g. a hall IC), the impact on the error of the positional signal still remains although reduced in comparison with that of the Japanese Patent 3500328.

SUMMARY OF THE INVENTION

Accordingly, an object of the present invention is to provide a new and novel motor drive controller. Such a new and novel motor drive controller controls rotation of a magnetic rotor of a motor by flowing periodic current through coils of plural phases. The motor drive controller includes a position detector that detects and outputs positional signals representing rotational positions of the magnetic rotor at first resolution, and a position change detector that detects and outputs position change signals representing positional changes of the magnetic rotor at second resolution higher than the first resolution. A phase synchronizing circuit is provided to generate and output first absolute phase information at third resolution based on the positional signals and position change signals. The phase synchronizing circuit generates and outputs second absolute phase information representing rotational positions of the magnetic rotor at fourth resolution higher than the third resolution in synchronism with the first absolute phase information. A drive voltage signal outputting device is provided to output a drive voltage signal for flowing the periodic current through the coils of the plural phases in accordance with the second absolute phase information.

In another aspect, a phase synchronizing circuit generates and outputs first pulse signals in synchronism with the position change signals. A phase counter is provided to count the pulse signals outputted by the phase synchronizing circuit with reference to a prescribed one of the positional signals. The phase counter outputs absolute phase information representing positions of the magnetic rotor in accordance with a count value obtained by counting the pulse signals. The absolute phase information has a resolution higher than that of the positional signals. A drive voltage signal outputting device is provided to output a drive voltage signal flowing a prescribed level of the periodic current through the coils of the plural phases in accordance with the absolute phase information.

In yet another aspect, a drive controller is provided and includes a velocity detector that detects a frequency corresponding to the rotation number of the magnetic rotor, a frequency difference detector that detects an difference between a target frequency corresponding to a target velocity of the magnetic rotor and that detected by the velocity detector, and a control voltage signal generator that generates a control voltage signal for driving the motor based on the frequency difference. A sine wave generator is also provided to output a sine wave drive signal flown through the coils of plural phases based on the absolute phase information. A sine wave amplitude modulator I also provided to modulate the amplitude of the sine wave drive signal and generate the drive voltage signal.

In yet another aspect, the drive controller includes a velocity detector that detects a frequency corresponding to the rotation number of the magnetic rotor, a current detector that detects current flowing through the coils of plural phases, and a frequency difference detector that detects an difference between a target frequency corresponding to a target velocity of the magnetic rotor and that detected by the velocity detector. A target current generator is provided to generate a target current signal for driving the motor. A current vector controller is further provided to generate the drive voltage signal by executing current vector control calculation based on the absolute phase information, the target current signal and the current value detected by the current detector.

In yet another aspect, the positional change detector detects a velocity.

In yet another aspect, the positional change detector includes a frequency generator.

In yet another aspect, the frequency generator includes an electrical print coil system.

In yet another aspect, an image forming apparatus comprises the motor drive controller.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

PREFERRED EMBODIMENTS OF THE PRESENT INVENTION

Figure 1:
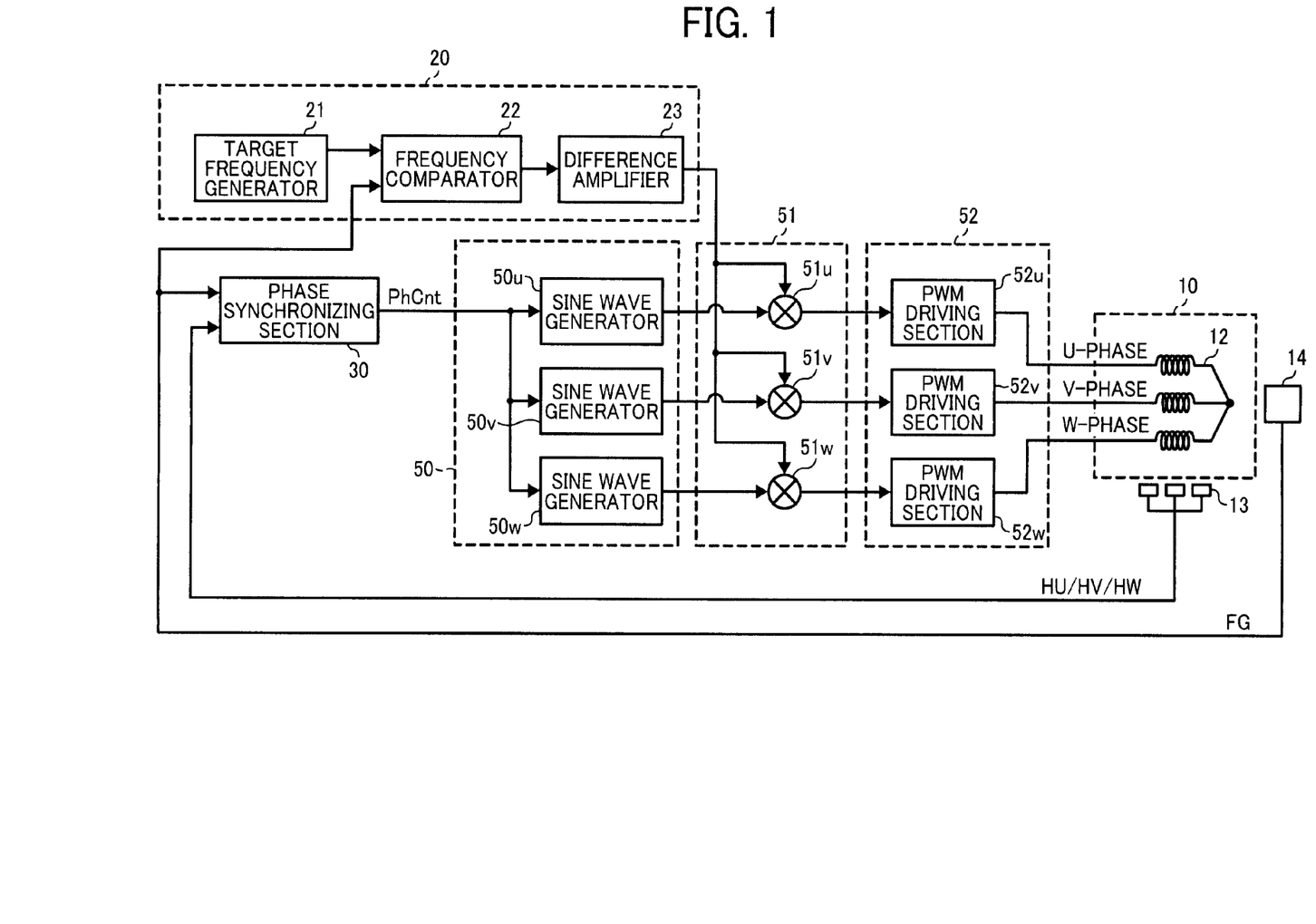
FIG. 1 illustrates an exemplary configuration of a motor drive controller according to a first embodiment of the present invention.
Figure 2:
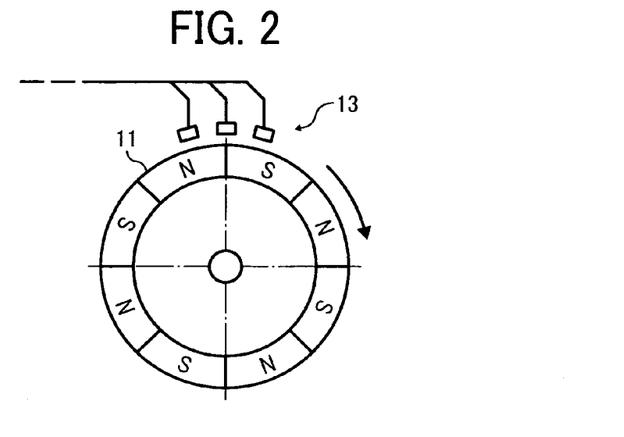
FIG. 2 illustrates an exemplary model of a rotor of a motor and Hall elements for detecting a position of the magnetic rotor.

Referring now to the drawing, wherein like reference numerals designate identical or corresponding parts throughout several views, in particular in FIGS. 1 and 2, a non-brush motor 10 is provided and includes coils 12 of three phases of U, V and W wired in a Y-letter shape with a phase difference of 120 degree from each other.

The non-brush motor 10 also includes a rotor 11 (not shown in FIG. 1) as permanent magnets having S and N poles alternately arranged while facing the coil 12 as shown in FIG. 2. The permanent magnets of the magnetic rotor 11 include eight poles.

Figure 3:
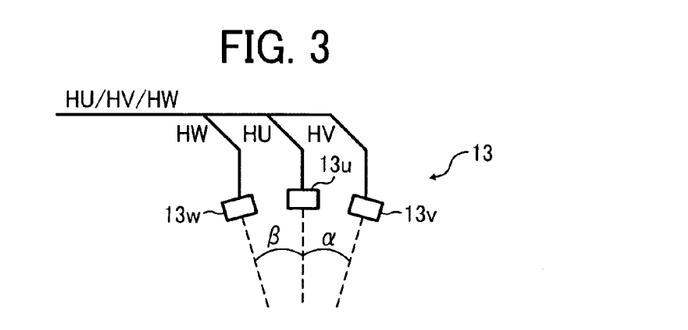
FIG. 3 illustrates an exemplary arrangement angle of three hall elements.

A hall sensor 13 is provided as a position detector and includes three hall ICs 13$u$, 13$v$ and 13$w$ secured to the vicinity of the magnetic rotor 11 as shown in FIGS. 2 and 3. Each of the hall ICs is formed from a hall element and a hall amplifier as a package, and outputs binary hall signals HU, HV, or HW having a phase difference of 120 degree from the other in accordance with a change in a magnetic field cause by the permanent magnets of the magnetic rotor. Thus, the hall signals HU, HV, HW totally include six signal edges per one cycle and are enable to detect rotor positions at six points defined by combinations of high and low levels of these three hall signals. Since the magnetic rotor 11 includes these eight poles, four cycles of hall signals (i.e., half numbers of poles) are outputted per rotation of the magnetic rotor.

Figure 4:
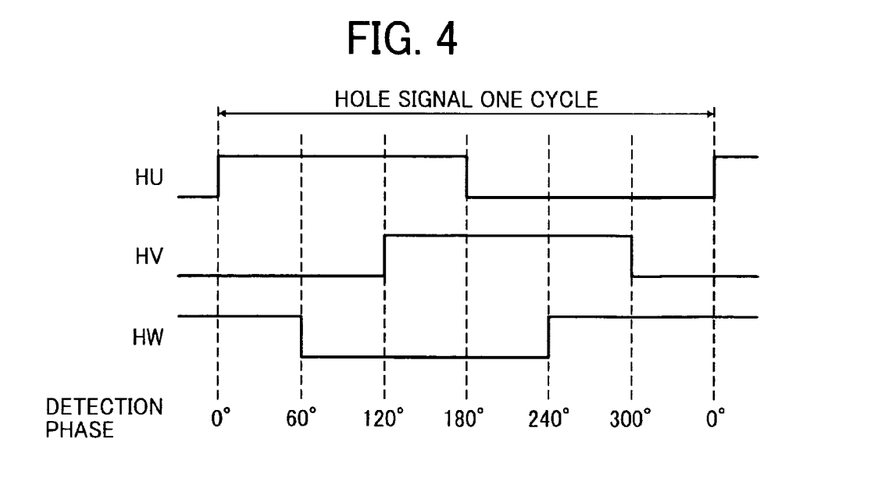
FIG. 4 illustrates an exemplary detection phases of the magnetic rotor of these three Hall elements.

To obtain the hall signals of FIG. 4, the hall ICs need to be arranged with a prescribed phase difference from the other. Since the magnetic rotor 11 includes the eight poles as mentioned above, hall ICs of 13$v$ and 13$w$ are arranged at arrangement angles α and β of 30 degree with that of 13$u$ serving as a reference when a rotation shaft of the magnetic rotor 11 is regarded as a center. Herein below, three hall signals HU, HV, and HW are collectively referred to as a hall signal HG. when all of them are meant.

The arrangement angles α and β of the hall ICs 13$v$ and 13$w$ with the 13$u$ are calculated by the below described formula:

$$\alpha = \beta = 120 \text{ degree (numbers of poles of rotor/2)} = 30 \text{ degree.}$$

The hall ICs are generally secured to an electronic substrate by reflow soldering together with the magnetic rotor. However, the reflow soldering readily causes arrangement error. For example, when an arrangement error occurs at hall IC 13$v$, and the angle α becomes 28 degree less than a normal angle of 30 degree, a phase detected by a hall signal HG, mentioned later in detail, is different from that of reality.

Figure 6:
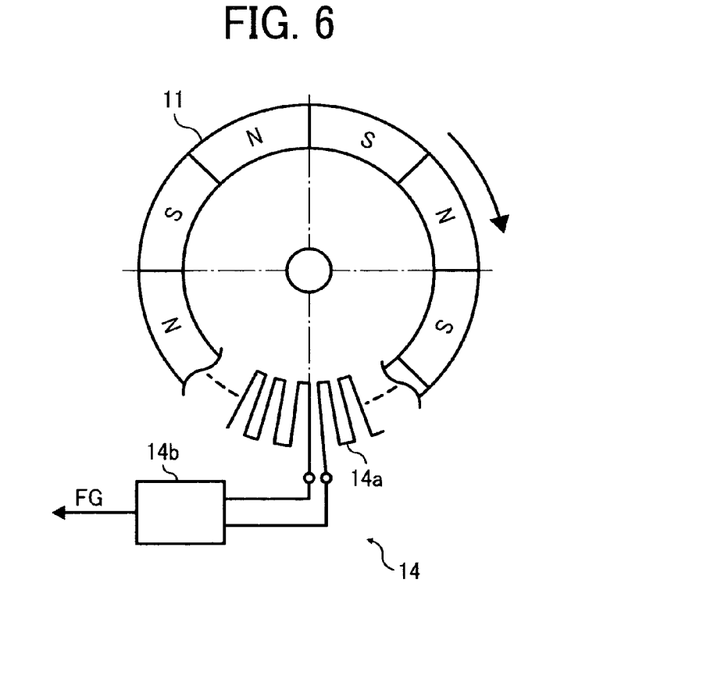
FIG. 6 illustrates an exemplary model of a print coil FG.

Back to FIG. 1, a FG (Frequency Generator) sensor 14 is provided as a velocity detector and functions as a frequency generator that outputs pulse signals FG having a prescribed frequency in accordance with rotation numbers of the magnetic rotor 11. As shown in FIG. 6, the FG sensor 14 includes a coil wiring 14$a$ on an electronic substrate on the magnetic rotor side along the magnetic poles of the magnetic rotor 11, and a FG amplifier 14$b$ that outputs binary pulse signals FG by amplifying and fairing signals generated in the coil wiring 14$a$. In this embodiment, thirty-six pulse signals FG are outputted per rotation of the magnetic rotor 11. The number of pulses of the pulse signals FG represents an amount of positional change of the magnetic rotor. Specifically, the FG sensor 14 serves as a positional change detector.

A FG-sensor 14 employs a print coil FG and is highly precisely produced at low cost by wiring a coil on an electronic substrate using a wiring production process. The FG sensor can be replaced with an optical encoder or the like.

A target frequency generator 21 generates pulse signals corresponding to a target rotation number of the non-brush motor 10. The pulse signal of the target frequency can be inputted from an outside of the apparatus other than the target frequency generator 21. Otherwise, the pulse signals of the target frequency can be either outputted by the target frequency generator 21 or inputted from outside.

A frequency comparator 22 is provided and compares the frequency of the pulse signal FG outputted by the FG sensor 14 with that of the pulse signal outputted by the target frequency generator 21, and generates and outputs a difference signal in accordance with a difference therebetween.

The difference amplifier 23 amplifies the difference signal outputted by the frequency comparator 22 and outputs control data that substantially equalizes rotation velocity corresponding to the target frequency with real rotation velocity of the motor. The difference amplifier 23 outputs positive control data when the frequency of the pulse signal FG is lower than the target frequency. The difference amplifier 23 can integrate a signal component of a low band of the difference signal, and can include a filter that attenuates a noise component in a high band of the difference signal.

As described later, a value obtained by modulating amplitude of a sine wave drive waveform in accordance with the control data represents an application voltage applied to the coil 12. Thus, the target frequency generator 21, the frequency comparator 22, and the difference amplifier 23 collectively serve as a control data generator.

A phase synchronization section 30 is provided and receives the pulse signal FG and the hall signal HU and generates a clock signal VcoClk as mentioned later. The phase synchronization section 30 outputs a phase count PhCnt as an absolute phase signal regarding the hall signal HU as a reference, and is formed from a phase locked loop (PLL) circuit, for example, as a phase synchronization circuit. Specifically, the phase synchronization section 30 generates the clock signal VcoClk based on the pulse signal FG with its phase synchronizing with a rising edge of the hall signal HU, and counts and outputs the clock signal VcoClk as the phase count PhCnt. The clock signal VcoClk has a frequency obtained by multiplying that of the pulse signal FG by sixty-four, for example. The frequency of the pulse signal FG is nine times as much as that of the hall signal HG.

Now, an exemplary configuration of the phase synchronization section 30 is described with reference to FIG. 7. An edge detector 31 is provided and detects a rising edge of the hall signal HU and outputs a hall edge detection signal. The edge detector 31 also detects a rising edge of the pulse signal FG and outputs a FG edge detection signal.

A reference phase generator 32 is provided and outputs a reference count counted with reference to a rising edge of the hall signal HU when receiving the hall edge detection signal. The reference count is updated when the FG edge detection signal is inputted thereto as described later in detail.

Figure 8:
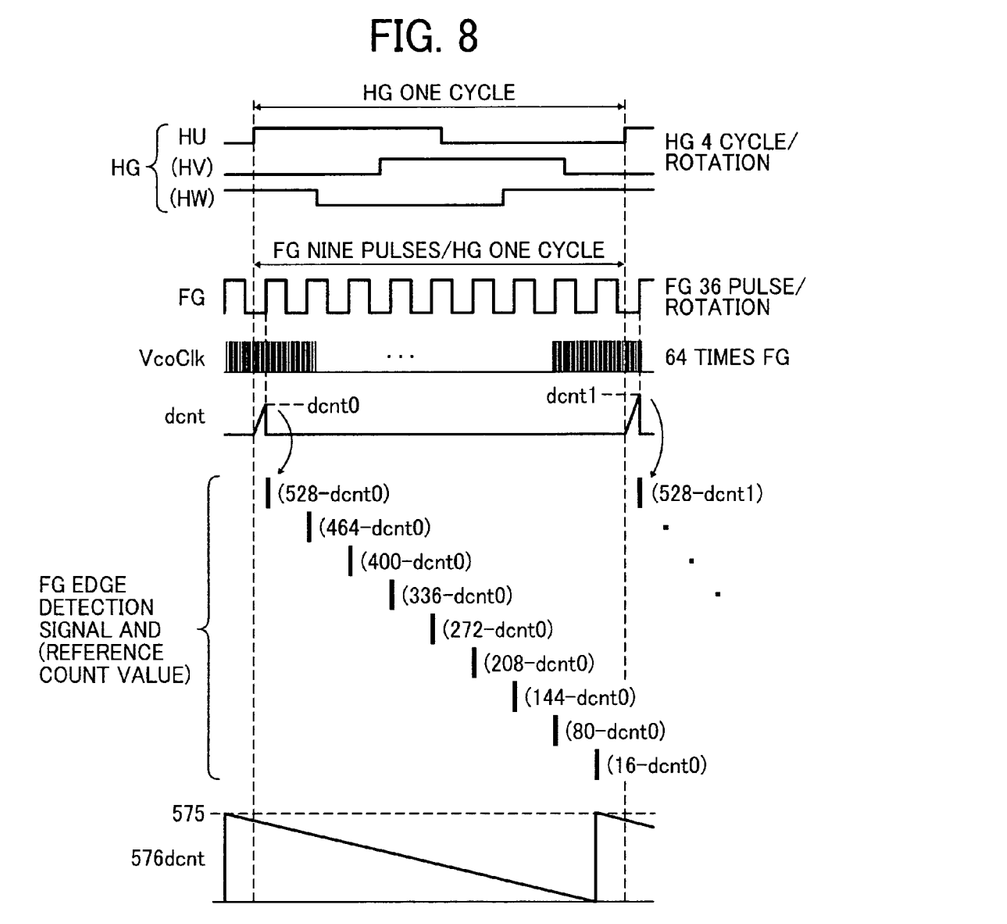
FIG. 8 illustrates an exemplary operation of a reference phase generator.

Now, an exemplary operation of the reference phase generator 32 is described with reference to FIG. 8. The reference phase generator 32 starts counting clock signals VcoClk up from zero from when the hall edge detection signal is inputted from the edge detector 31 to when the FG edge detection signal is inputted next as a hall FG delay count dcnt.

Thus, when the hall FG delay count dcnt0 is given when a prescribed hall edge detection signal is inputted and a FG edge detection signal is inputted right thereafter, the reference count value is updated to be (528−64×(n−1)−dcnt0) and is outputted when n-th number FG edge detection signal is inputted after the input of the prescribed hall edge detection signal.

For example, when the FG edge detection signal is inputted right after the input of the prescribed hall edge detection signal (i.e., n=1), the reference count value is counted as 528−dcnt0. When the FG edge detection signal is inputted next (i.e., n=2), the reference count becomes 464−dcnt0. Subsequently, the similar calculation as above is repeated until the next hall edge detection signal is inputted.

Numeral 528 of the reference count corresponds to a rotor position represented by a rising edge of a hall signal HU. The delay count dcnt0 represents an offset from when a hall edge detection signal that represents a rising time of the hall signal HU is inputted to when the FG edge detection signal is inputted right thereafter (i.e., a time when the reference count is updated) as mentioned above. Since a frequency of the clock signals VcoClk is a value obtained by multiplying that of the pulse signal FG by sixty four, the reference count decreases by sixty-four per FG edge detection signal.

When the value n is not less than 10 or the value dcnt0 is relatively large, and accordingly the reference count is negative, the count number 576 is added to the reference count. The reference phase generator 32 outputs the reference count.

Figure 7:
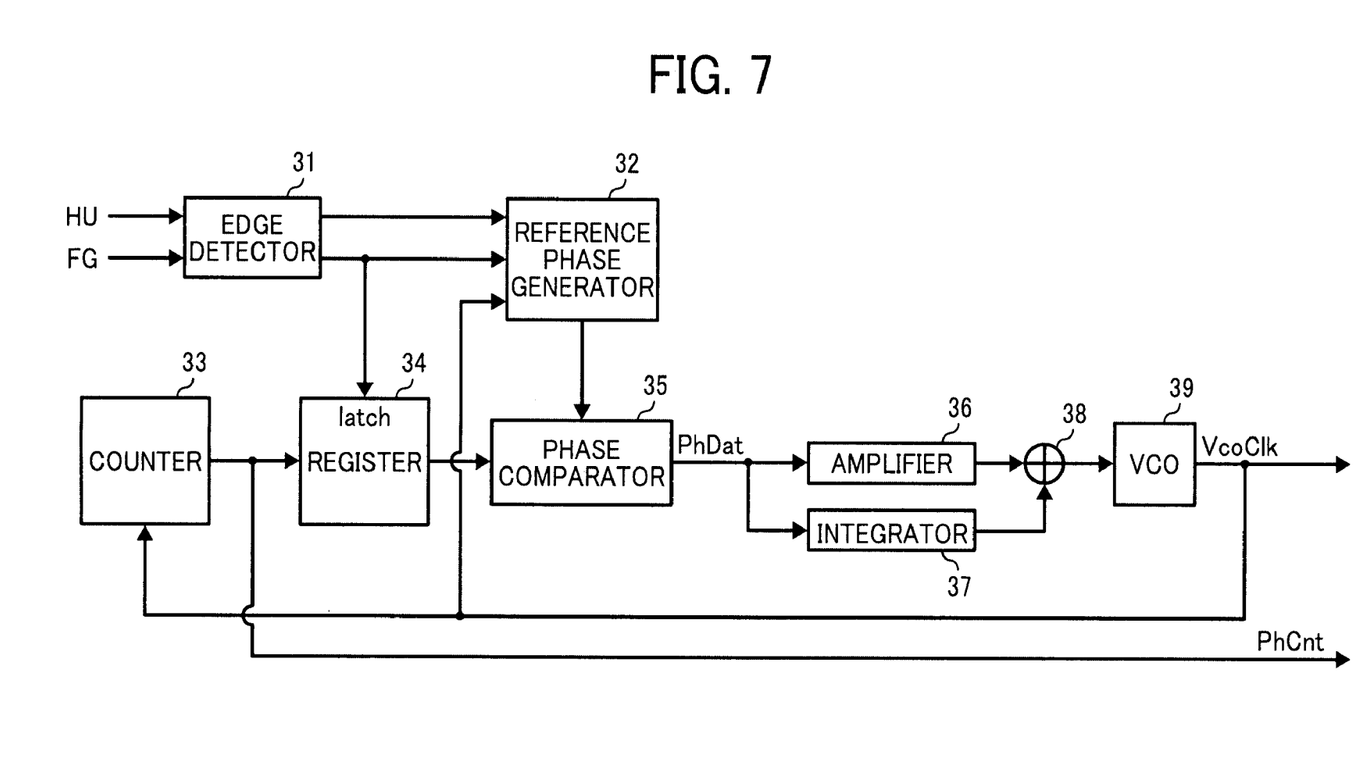
FIG. 7 illustrates an exemplary configuration of a phase synchronization section.

Back to FIG. 7, the phase synchronization section 30 is further described. A counter 33 receives clock signals VcoClk outputted by a VCO 39 mentioned later in detail and starts down counting repeatedly from 576 to 0 and outputs a count value upon the input of the signal. The count value outputted by the counter 33 is outputted from the phase synchronization section 30 as a phase count PhCnt.

A register 34 is provided and latches a counter value of the counter 33 when a FG edge detection signal is inputted. A phase comparator 35 compares a count value stored in the register 34 with the reference count value outputted by the reference phase generator 32 one after another, and calculates and outputs a difference therebetween as a phase difference PhDat.

The phase difference PhDat is zero when the FG edge detection signal is generated and the count value of the counter 33 is equal to the reference count value. Whereas when the count value of the counter 33 is more than the reference count value (i.e., the count value represents a delayed phase), the phase difference PhDat is positive ranging from +1 to +32. When the count value is less than the reference count value (i.e., the count value represents an advancing phase), the phase difference PhDat is negative ranging from −1 to −32.

An amplifier 36 amplifies the phase difference PhDat and outputs resultant data to an adder 38. An integrator 37 integrates the phase difference PhDat and outputs resultant data to the adder 38. The adder 38 totals the outputs from the amplifier 36 and the integrator 37 and outputs the sum to a VCO 39.

Owing to the above-mentioned devices of the amplifier 36, the integrator 37, and the adder 38, when a frequency of the pulse signals FG is constant, the output of the integrator 37 becomes constant in average, and the phase difference PhDat is controlled to be zero in average without stationary difference.

The VCO 39 is a digital voltage oscillator and outputs clock signals VcoClk with a frequency in proportion to a signal value outputted by the adder 38. The VCO 39 can be an analog type that applies D/A conversion into an analog voltage to the output of the adder 38. Specifically, a frequency is increased and a counter phase is advanced when the phase difference PhDat is positive value (i.e. a count value represents a delayed phase). Whereas, a frequency is decreased and a counter phase is delayed when the phase difference PhDat is negative (i.e. a count value is a advance phase). Any way, the frequency of the clock signals VcoClk and the phase count PhCnt serving as a count value of the counter 33 are controlled so that the phase difference PhDat becomes zero. The frequency of the clock signals VcoClk is a level obtained by multiplying that of the hall signal by 576 or that of the pulse signals FG by 64.

Even not shown, a lock determination section is provided to determine that the PLL enters a lock condition when the phase difference PhDat is continuously within a prescribed range around zero as a center for a time period more than a prescribed level.

As mentioned here to fore, the phase synchronization section 30 includes the PLL circuit that outputs the phase count PhCnt to generate a sine wave by receiving the hall signals HU and the pulse signals FG. Since the PLL circuit is enabled to phase synchronization only with an edge of one hall signal HU among the hall signal HG, a noise like change in absolute phase information generated based on a positional signal can be smoothed as in the conventional art while substantially completely removing an influence of arrangement error of the hall sensor even impossible in the conventional art. Further, since phases are also compared with each other in synchronism with an edge of the pulse signal FG that highly precisely represents a positional change of the magnetic rotor, a number of points, where the phases are compared within one cycle of the hall signal HG, increases, whereby a highly precise and resolution phase count Phcnt can be obtained.

Further, every rising edges of the hall signal HG can be referred to as far as a reference count value is appropriately generated and outputted by the reference phase generator 32.

Back to FIG. 1, an exemplary configuration of the apparatus is further described. The sine wave generator 50 includes U, V and W phase sine wave generator elements 50$u$, 50$v$ and 50$w$ and outputs three phase sine waveforms normalized to have an amplitude of one degree and to be applied to U, V and W phases of coils 12, respectively, based on a phase count PhCnt outputted by the phase synchronization section 30. Further, since the sine wave generator 50 generates the signals based on the phase count PhCnt generated by counting the clock signals VcoClk not influenced by the arrangement error of the hall sensor, wave distortion of the normalized sine wave signal is reduced more than a conventional system, and as a result, disturbance of motor rotation can be suppressed. Thus, the normalized sine wave signal represents the sine wave drive signal in this invention.

A multiplier 51 as a sine wave amplifier modulator includes U, V and W phase multiplier elements 51$u$, 51$v$ and 51$w$. These U, V and W phase multiplier elements 51$u$, 51$v$ and 51$w$ multiply normalized sine wave signals of u, V and W phases and control data outputted by the control data generator 20 and output calculation results as driving data. Thus, the multiplier 51 represents a sine wave amplification modulator, and output drive data thereof serves as a drive voltage signal in this invention.

Control data generator 20, the sine wave generator 50, and the multiplier 51 collectively serve as a driving controller.

A PWM driving section 52 includes U, V and W phase PWM driving elements 52$u$, 52$v$ and 52$w$. These PWM driving elements 52$u$, 52$v$ and 52$w$ apply pulse width modulation (PWM) to driving data for U, V and W phases and drive the coil 12 with pulse width in proportion to the driving data, thereby flowing current therethrough, respectively.

For example, when a cycle of a pulse subjected to the PWM in the PWM driving section 52 is premised as a prescribed value of tpwm, while a length of the pulse subjected to the PWM in proportion to the absolute value of the driving data is premised as tdata, the driving data represents a signal having a positive or negative value around zero. Specifically, a duty of the output pulse is 50% with a pulse width of tpwm/2 when the driving data is zero. When the driving data is positive, a width of the output pulse becomes relatively longer in proportion to the absolute value of the driving data with reference to the duty of 50%. Whereas when the driving data is negative, a width of the output pulse becomes relatively shorter in proportion to the absolute value of the driving data with reference to the duty of 50%. The value tpwm is preferably sufficiently designated shorter than a cycle of the sine wave driving wave.

Figure 9:
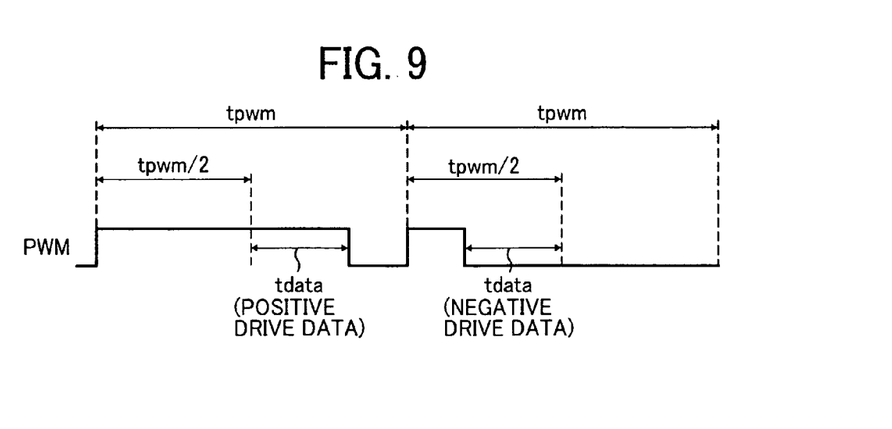
FIG. 9 illustrates exemplary waves of drive data outputted by a PWM.

Even though pulse voltages are applied to each of the phase terminals of the coil 12 during the PWM driving as shown in FIG. 9, the pulse voltage can be smoothed due to an effect of inductance, so that a sine wave current flows.

Even not shown, a prescribed system is provided in addition to the above-mentioned devices to rotate and drive the motor in an open loop driving manner in which a prescribed voltage having prescribed frequency and width is applied to the coil, and drive and rotate the motor in a rectangular wave driving or the open loop driving manner when an apparatus starts up and the PLL is not in the lock condition. When the PLL enters the lock condition, the motor is rotated by the sine wave driving manner of this embodiment.

Hence, since the phase synchronization section executes phase synchronization with reference to one edge of the hall signals HG based on the pulse signal FG that represents a change in rotor position, highly precise absolute phase information can be generated avoiding ill influence of an erroneous arrangement of the hall sensor. Thus, since a sine wave driving waveform can be generated only with small distortion, motor driving control can be precisely executed suppressing noise and vibration.

Further, the pulse signal FG is an output signal of the print coil FG and represents rotation velocity of the motor to be used to control the velocity. The print coil FG has high precision at low cost and is widely spreading. Accordingly, the phase synchronization section can be realized at low cost omitting an additional detector.

Now, a second embodiment is described with reference to FIG. 10, wherein a non-brush motor 10, a hall sensor 13, and an FG sensor 14 are substantially the same as those in the first embodiment. Also substantially the same devices are a target frequency generator 21 and a frequency comparator 22.

A target current generator 81 outputs q-axis target current data and d-axis target current data as target current values to be flown in accordance with a frequency difference outputted by the frequency comparator 22 so that rotation velocity of the motor corresponding to the target frequency is substantially the same as real rotation velocity thereof.

The target frequency generator 21, the frequency comparator 22, and the target current generator 81 collectively constitute a targe5 current data generator 80.

A current sensor 85 detects currents flowing through U and V phases of the coil 12 and includes shunt resistances serially inserted into the coils of the U and V phases and an amplifier that detects a potential difference between both ends of the shunt resistances and outputs thereof as coil current signals by amplifying signal components and attenuating noise components, respectively. The coil current signal is premised to include two signals that represent currents flowing through U and V phases of the coils 12. The above-mentioned current sensor 85 can employ a current sensor IC or the like utilizing widely known hall elements.

A current detector 86 includes an A/D converter, and applies A/D conversion to a coil current signal outputted by the current sensor 85. The current detector 86 thus outputs U and V phase current data iu and iv which represent coil currents of U and V phases, respectively.

The phase synchronization circuit 60 includes a PLL circuit enabling a phase to synchronize with that of a pulse signal FG, and outputs clock and lock signals SinClk and Lock. Specifically, the phase synchronization circuit 60 compares the rising edge of the pulse signal FG with a phase of the clock signal VcoClk generated, and changes a frequency of the clock signal VcoClk in accordance with the comparison result.

As a result, the clock signal VcoClk is generated with its phase being in synchronism with the pulse signal FG, while a clock signal SinClk is outputted by dividing a frequency of the clock signals VcoClk. Further, a frequency of the clock signals VcoClk is a level obtained by multiplying that of the pulse signal FG by 128. The clock signals SinClk are obtained by dividing the frequency of the clock signal VcoClk by eight (f/8).

Figure 11:
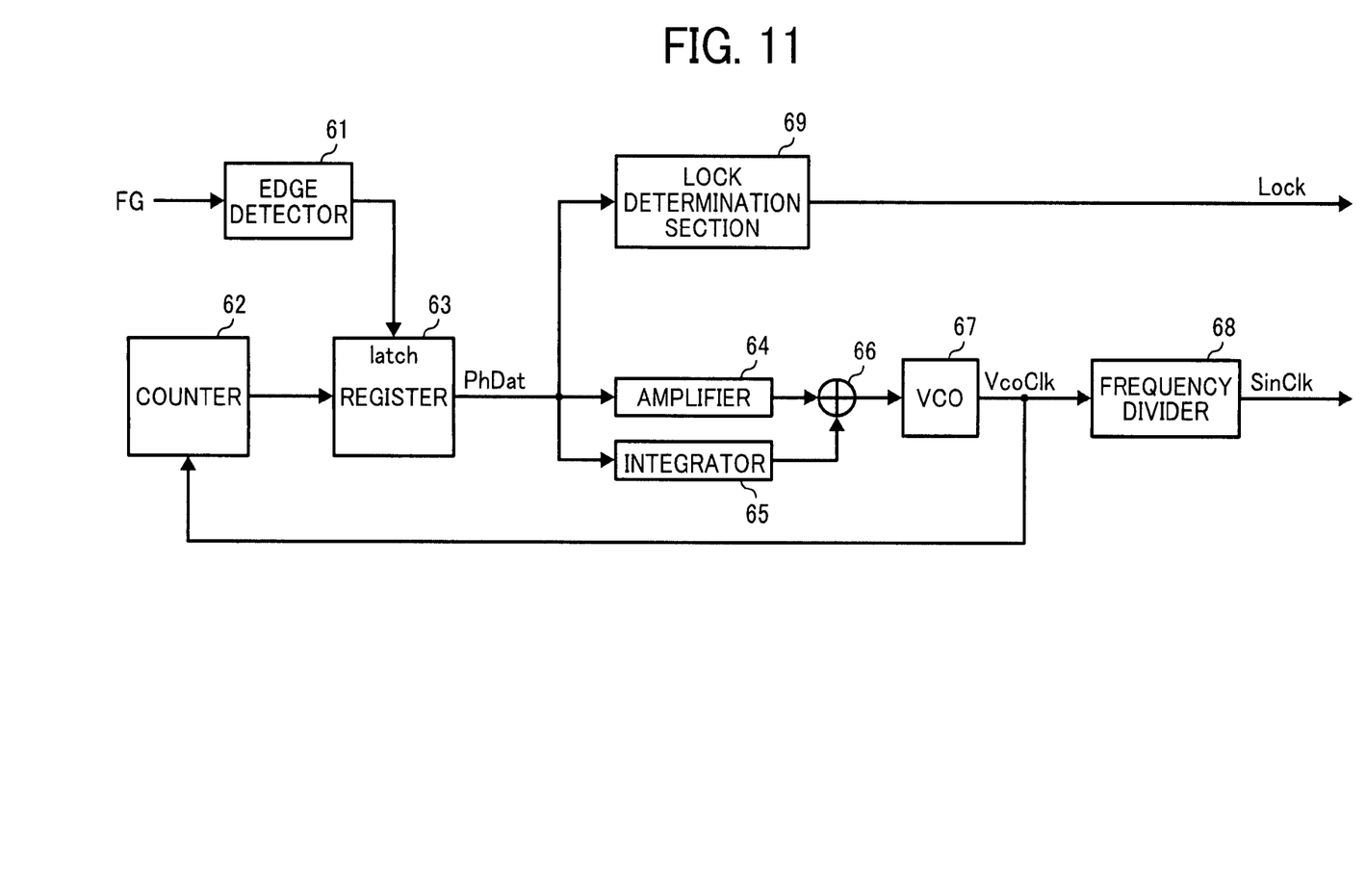
FIG. 11 illustrates an exemplary phase synchronization circuit.

Now, an exemplary phase synchronization circuit 60 is described with reference to FIG. 11. An edge detection 61 detects a rising edge of the pulse signal FG and outputs a FG edge detection signal.

A counter 62 receives the clock signals VcoClk outputted by a VCO 67 mentioned later in detail, and starts down counting per the input thereof. Specifically, the counter 62 has a seven-bit width that repeatedly counts down from 127 to zero and outputs a count value.

A register 63 is enabled to latch the count value stored in the counter 62 when the FG detection signal is inputted and to output the latched count value as a phase difference PhDat.

When the phase difference PhDat is supposed to range from −64 to +63 by regarding the seven bit of count values of from 127 to zero as latched as complement of two and there is no phase difference between the pulse and clock signals FG and VcoClk when the FG edge detection signal is generated, the count value of the phase difference PhDat becomes zero. Whereas when a phase of the clock signal VcoClk delays at the time, the phase difference PhDat becomes a positive value ranging from +1 to +63. Whereas when a phase of the clock signal VcoClk advances, the phase difference PhDat becomes a negative value from −1 to −64.

An amplifier 64 amplifies the phase difference PhDat and outputs resultant data to an adder 66. An integrator 65 integrates the phase difference PhDat and outputs the resultant data to the adder 66. A multiplier 66 multiplies an output of the amplifier 64 by that of the multiplier 65 and outputs the resultant data to a VCO 67.

Due to the system of the above-mentioned amplifier 64, the integrator 65, and the multiplier 66, an average of outputs of the integrator 65 becomes constant, and an average of the phase difference PhDat is controlled to be zero suppressing a stationary difference, when a frequency of the pulse signal FG is constant.

The VCO 67 is a digital voltage control oscillator and outputs a clock signal VcoClk with the frequency in proportion to a value of an output signal of the adder 66. The VCO 67 can convert the output of the adder 66 into an analog voltage by applying the D/A conversion to serve as an analog VCO. Specifically, when the phase difference PhDat is a positive value, the frequency is increased and a counter phase is advanced. Whereas when the phase difference PhDat is a negative value, the frequency is decreased and the counter phase is delayed. As a result, the frequency of the clock signal VcoClk and the counter value of the counter 62 are controlled so that the value of the phase difference PhDat becomes zero. The frequency of the clock signal VcoClk is a level obtained by multiplying that of the pulse signal FG by 128.

A frequency demultiplier (i.e., a divider) 68 divides a frequency of the clock signals VcoClk by eight and outputs resultant data as a clock signal SinClk to generate a sine wave. Since the frequency of the clock signal SinClk is 16 times as much as that of the pulse signals FG; and the frequency of the pulse signals FG is 9 times as much as that of the hall signals HG, the frequency of the clock signal SinClk becomes 144 times as much as that of the hall signal HG.

A lock determination section 69 continuously monitors the value of the phase difference PhDat for more than a prescribed time period. When the phase difference PhDat is within a prescribed range including zero point at its center, the lock determination section 69 determines that the PLL circuit is in the lock condition and thus outputs a high level of the lock signal Lock. Whereas when the phase difference PhDat is without the prescribed range, the lock determination section 69 (determines that the PLL circuit is not in the lock condition and) outputs a low level of the lock signal Lock.

Figure 10:
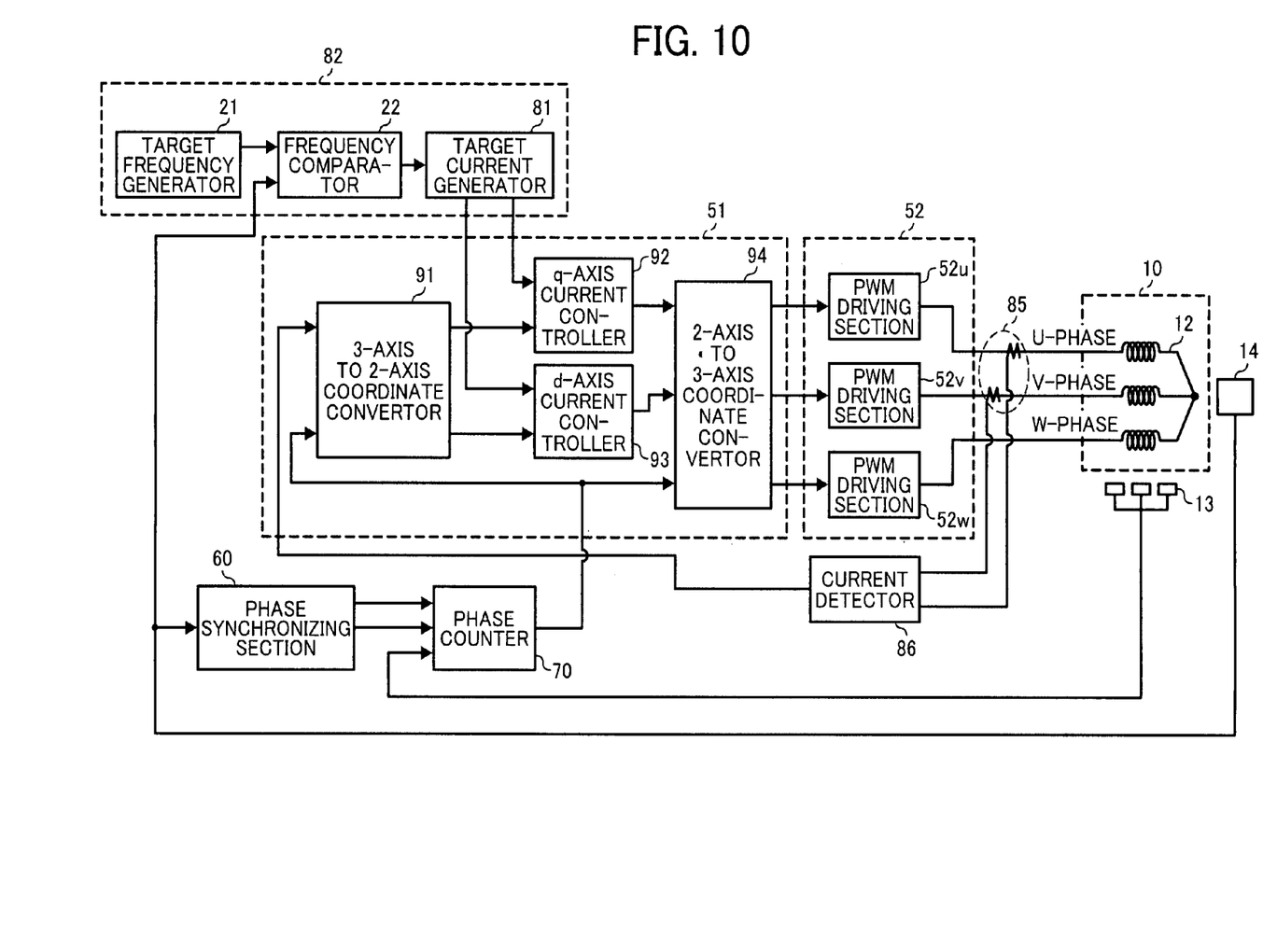
FIG. 10 illustrates an exemplary configuration of a motor drive controller according to a second embodiment of the present invention.

Back to FIG. 10, based on the clock signal SinClk, the lock signal Lock outputted by the phase synchronization circuit 60, as well as the hall signal HG, the phase counter 70 outputs a phase count PhCnt that represents an absolute phase in one cycle of the hall signal HG.

Figure 12:
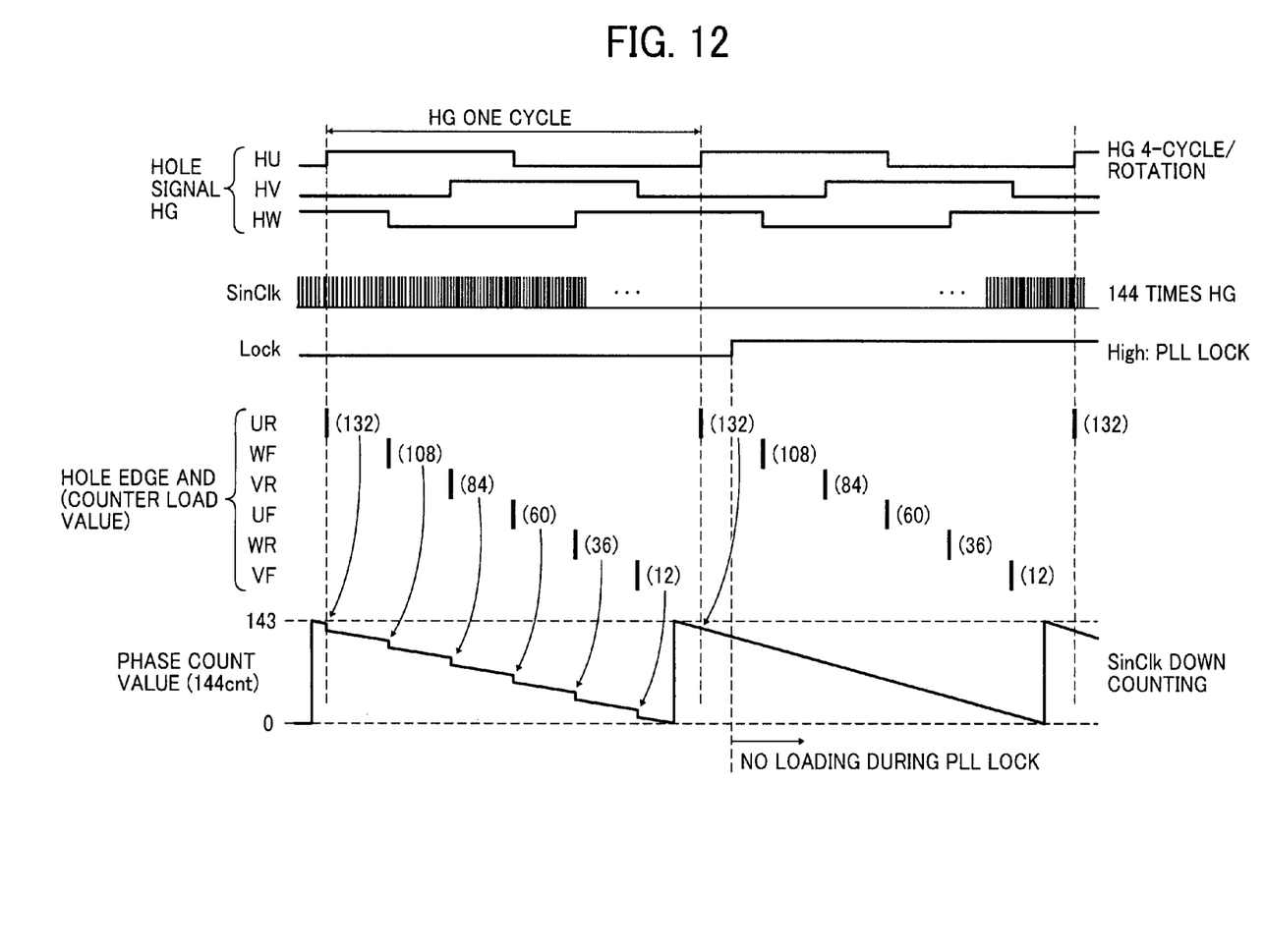
FIG. 12 illustrates an exemplary operation of a phase counter.

Specifically, the phase counter 70 includes a hall edge detector that detects all of edges of the hall signal HG and a counter that repeatedly counts clock signals SinClk from 143 down to zero. Thus, as shown in FIG. 12, every when the lock signal is in the low level (i.e., the PLL circuit is not in the lock condition) and the edge of the hall signal HG is detected, the phase counter 70 loads a counter load value corresponding to the edge detected to a counter of the phase counter 70. Counter load values corresponding to the edges of the hall signal HG are predetermined as described below. Counter load value 132 corresponds to a rising edge UR of the hall signal HU. Counter load value 108 corresponds to a dropping edge WF of the hall signal HW. Counter load value 84 corresponds to a rising edge VR of the hall signal HV. Counter load value 60 corresponds to a dropping edge UF of the hall signal HU. Counter load value 36 corresponds to a rising edge WR of the hall signal HW. Counter load value 12 corresponds to a dropping edge VF of the hall signal HV.

Whereas when the lock signal is in a high level (i.e., the PLL circuit is in the lock condition), the phase counter 70 does not load a counter value and simply counts the clock signals SinClk and outputs the same As a phase count PhCnt.

Thus, the phase counter 70 corresponds to a phase control device, and the phase count PhCnt, absolute information, respectively.

Figure 5:
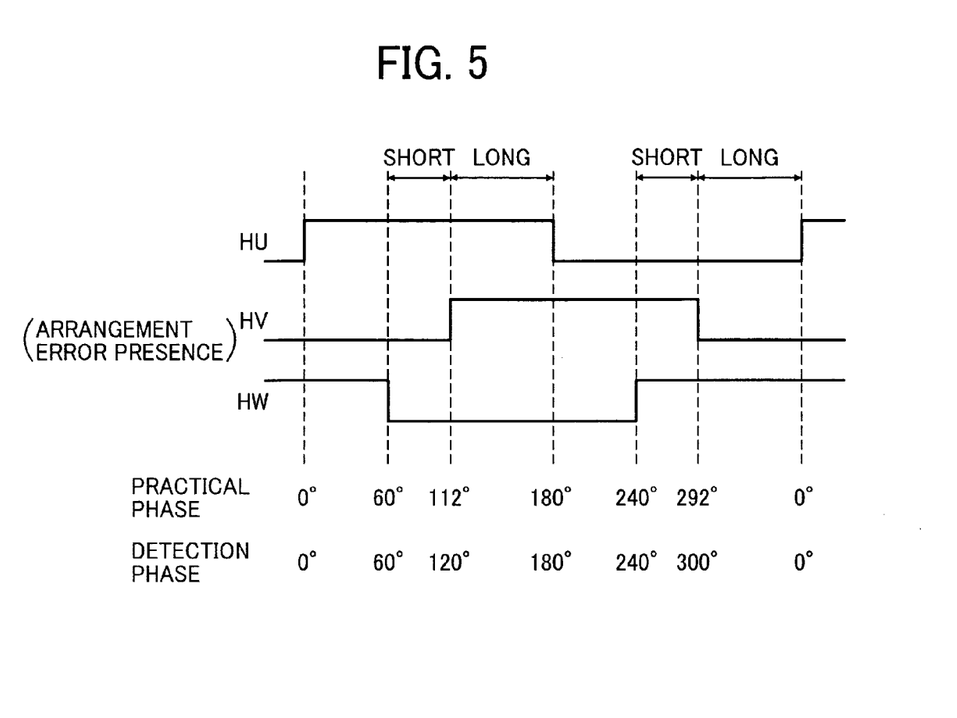
FIG. 5 illustrates an exemplary rotor detection phases when the Hall elements are erroneously arranged.

As mentioned heretofore, since the phase synchronization circuit 60 is enabled to generate a high resolution clock signal SinClk in synchronism with a highly precise pulse signal FG at a reasonable price also used in detecting rotation velocity of the magnetic rotor, while a phase counter 70 counts clock signals SinClk and generates the phase counts PhCnt with reference to only one edge of the hall signal HG just before the phase synchronization circuit 60 becomes the lock condition, a noise like change in absolute phase information generated based on a positional signal can be smoothed as in the conventional art. At the same time, an influence of erroneous arrangement of the hall sensors as shown in FIG. 5 can substantially be removed completely different from the conventional art. Further, since synchronizing with the phase of the pulse signal FG that highly precisely represents a positional change, a number of points where the phases are compared in one cycle of the hall signal HG increases, whereby a highly precise and resolution phase count Phcnt can be obtained.

Further, a current vector control section 90 executes current vector control calculation and outputs driving data that represents voltages to be applied to terminals of U, V and W phases of coils 12 based on target current data outputted by a target current data generation section 82, coil current data iu and iv, and the phase count PhDat.

The current vector control section 90 includes a three-two axis coordinate converter 91 that applies coordinate conversion to coil current data iu and iv from a UVW axis coordination system (i.e., a three axis coordination system) having a phase difference of 120 degree from the other into a dq-axis coordination system (i.e., a rotation orthogonal two axis coordination system) that rotates in accordance with a rotational position of the magnetic rotor (herein after called three-two axis coordinate conversion). Specifically, the three-two axis coordinate converter 91 calculates and outputs d-axis current data id and q-axis current data iq on the dq-axis coordination system. The phase count PhCnt is utilized as positional information of the magnetic rotor of high resolution needed in the three-two axis coordinate conversion.

A q-axis current controller 92 calculates q-axis current difference between q-axis target current data and q-axis current data iq, and totals a value obtained by amplifying the q-axis current difference and that integrating the same. The q-axis current controller 92 then outputs calculation resultant data as q-axis control data.

A d-axis current controller 93 calculates d-axis current difference between d-axis target current data and d-axis current data id, and totals a value obtained by amplifying the d-axis current difference and that integrating the same. The d-axis current controller 93 then outputs calculation resultant data as d-axis control data.

A two-three axis coordinate converter 94 applies coordinate conversion to q and d-axis control data into a dq-axis coordination system that rotates in accordance with a rotational position of the magnetic rotor (i.e., a rotation orthogonal two axis coordination system) into a three-axis coordination system of a UVW coordinate system having a phase difference of 120 degree from the other (herein after called two-three axis coordinate conversion). The two-three axis coordinate converter 94 then calculates and outputs driving data of three phases on the UVW axis coordination system. The phase count PhCnt is utilized as positional information of the magnetic rotor of high resolution needed in the two-three axis coordinate conversion. Thus, drive data corresponds to a drive voltage signal. The target current data generator 82 and the current vector controller 90 collectively constitute a drive controller.

The PWM driving section 52 is similar to that in the first embodiment. A motor driving manner executed when the apparatus starts and the phase synchronization circuit is not in the lock condition is also substantially the same as those in the first embodiment.

According to the second embodiment, since a phase synchronization circuit outputs high resolution clock signals SinClk in synchronism with q phase of pulse signals FG having a frequency in accordance with velocity of the magnetic rotor, counts the clock signals SinClk and generates a phase count with reference only to one edge of the hall signal HG, highly precise absolute phase information can be generated avoiding an influence of arrangement error of the hall sensors. As a result, since a sensor such as an expensive high resolution encoder, etc., does not need to be added, driving of a non-brush motor can be controlled at low cost in a vector control manner.

If a driving motor of a photoconductive member or a developing device provided in an image forming section is controlled in the above-mentioned manner, sheets can be highly precisely conveyed suppressing noise and vibration. Further, if a driving motor of a carriage provided in a scanner is controlled in the above-mentioned manner, a high quality image is made suppressing the noise when an original document is thereby read.

Figure 13:
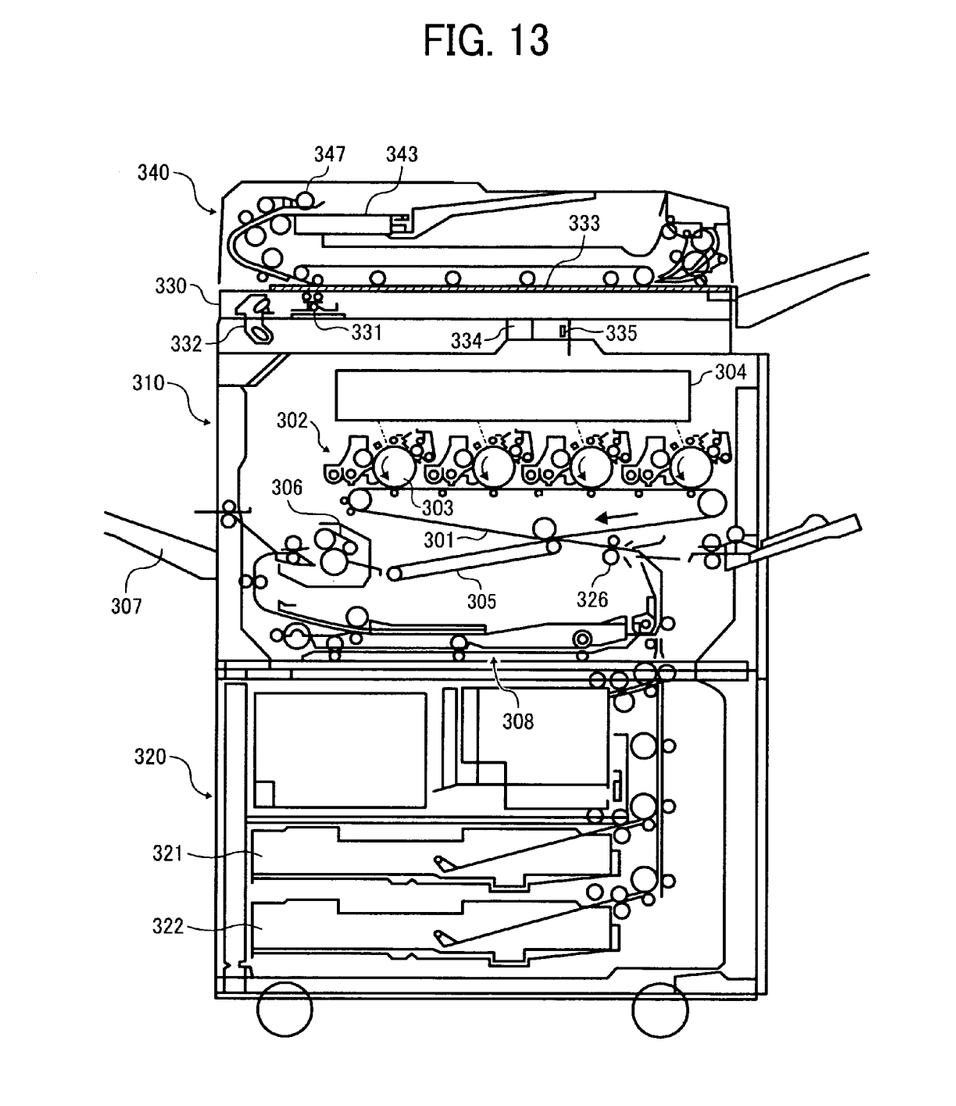
FIG. 13 illustrates an exemplary image forming apparatus to which the present invention is applied.

Now, an exemplary image forming apparatus of a tandem type full-color copier having an image reader is described with reference to FIG. 13. As shown, an apparatus body 310 is mounted on a sheet-feeding table 320. A scanner 330 is arranged on the topmost of the apparatus body 310. An auto document feeder (ADF) 340 is arranged on the scanner 330.

In the scanner 330, there is provided a first carriage 331 having a lighting source and mirrors, a second carriage 332 having mirrors movably arranged in parallel to a platen glass 333. The second carriage 332 includes a known optical system movable in half velocity as the first carriage 331. Thus, these first and second carriages 331 and 332 collectively execute scanning of the original image placed on the platen glass 332 while moving in a prescribed direction. A reflection light from the original document is imaged by a condensing lens 334 and is taken into a solid imaging element 335 such as a CCD, etc. Data thus taken in is then processed in an image processing section.

An intermediate transfer belt 301 is arranged almost at the center of the copier body 310. Four image formation units 302 are arranged along the upper side of the intermediate transfer belt 301. Each of the image formation units 302 includes various devices arranged around the photoconductive drum 303 to execute an electro-photographic process.

The intermediate transfer belt 301 is stretched around the plural supporting rollers and is rotated and conveyed clockwise in the drawing. A transfer roller as a primary transfer device is arranged facing the photoconductive drum 303 in each of the image formation units.

An exposure device 304 is arranged above each of the image formation units 302. The expo device 304 emits a writing light onto the photoconductive drum 303 of each of the image formation units 302.

There is arranged a transfer conveyance belt 305 below the intermediate transfer belt 301. One of the plural rollers supporting the intermediate transfer belt 305 serves as the second transfer roller to execute a secondary transfer process transferring an image on the intermediate transfer belt onto a recording medium.

On the left side of the transfer conveyance belt 305, there is provided a fixing device 306. A sheet ejection tray 307 is arranged on a left side surface of the fixing device 306. A sheet reversing section 308 is arranged at a lowest section of the apparatus body 310. Two steps of sheet feeding cassettes 321 and 322 are provided in the sheet-feeding table 320.

When a color copy is made using the color copier, an original document is set onto one of the original document setting table of the ADF 340 and the platen glass 333. When a start button arranged on an operation panel, not shown, is depressed, the scanner is driven. Then, a light is emitted from the light source and is reflected by the original document. The reflection light enters an imaging lens, not shown, so that the original document information is read.

Also when the start button arranged on an operation panel is depressed, a driving motor, not shown, rotates and conveys the intermediate transfer belt 301. At the same time, the photoconductive member 303 is rotated in the respective image formation units 302 to form monochrome component images of Black, yellow, magenta, and cyan thereon, respectively. These monochrome component images are transferred onto the intermediate transfer belt 301 one after another, so that a synthesized color image is formed.

Further, when the start button is depressed, a sheet is launched from the sheet-feeding table 320 and is temporarily stopped at a registration roller 326. Then, in synchronism with the synthesized color image on the intermediate transfer belt 301, the registration roller 326 resumes rotating and feeds the sheet between the intermediate transfer belt 301 and the transfer conveyance belt 305. Then, the secondary transfer section transfers the color image onto the sheet. After the secondary image transfer process, the sheet is conveyed to the fixing device 306, and the toner image is fixed. The sheet is then ejected onto the sheet ejection tray 307.

The above-mentioned motor is not limited to the outer rotor type, and can be an inner rotor type. The above-mentioned wiring patter is not limited to the Y-letter wiring, can employ a delta wiring. The above-mentioned number of poles of the motor rotor is not limited to eight. The above-mentioned velocity detector can employ various types of the FG sensor.

The office instruments can include an image reading device or the like.

A configuration of the image formation units can be optionally employed. An arrangement order of tandem type image formation section is also optional. Plural developing devices can be arranged around one photoconductive member. A revolver-developing device can be employed. The present invention can be applied to a dual color toner machine and a monochrome machine. The image forming apparatus can include a printer, a facsimile, and a multi-functional machine.

Numerous additional modifications and variations of the present invention are possible in latent image of the above teachings. It is therefore to be understood that within the scope of the appended claims, the present invention may be practiced otherwise that as specifically described herein.

What is claimed is:

1. A motor drive controller for controlling rotation of a magnetic rotor of a motor by flowing periodic current through coils of plural phases, said motor drive controller comprising:
   a position detector configured to detect and output positional signals representing rotational positions of the magnetic rotor at first resolution;
   a position change detector configured to detect and output position change signals representing positional changes of the magnetic rotor at second resolution higher than the first resolution;
   a phase synchronizing circuit configured to generate and output first absolute phase information at third resolution based on the positional signals and position change signals, said phase synchronizing circuit generating and outputting second absolute phase information representing rotational positions of the magnetic rotor at fourth resolution higher than the third resolution in synchronism with the first absolute phase information; and
   a drive voltage signal outputting device configured to output a drive voltage signal for flowing the periodic current through the coils of the plural phases in accordance with the second absolute phase information.

2. The motor drive controller as claimed in claim 1, wherein said position change signals are formed in a state of pulse signals, and wherein said phase synchronizing circuit compares a phase of the second absolute phase information with that of the first absolute phase information at every edge of the pulse signals and synchronizes the phase of the second absolute phase information with that of the first absolute phase information based on a result of the comparison of the phase synchronizing circuit.

3. The motor drive controller as claimed in claim 1, further comprising a first drive controller including:
   a velocity detector configured to detect a frequency of the position change signals generated in accordance with velocity of the magnetic rotor;
   a frequency difference detector configured to detect a difference between a target frequency corresponding to a target velocity of the magnetic rotor and that detected by the velocity detector;
   a control voltage signal generator configured to generate control voltage signals for driving the motor in accordance with the difference in frequency;
   a sine wave generator configured to output sine wave drive signals for flowing the periodic currents through the coils of plural phases based on the second absolute phase information; and
   a sine wave amplitude modulator configured to modulate amplitude of the sine wave drive signals.

4. The motor drive controller as claimed in claim 1, wherein said position change detector detects a velocity.

5. The motor drive controller as claimed in claim 4, wherein said position change detector includes a frequency generator.

6. The motor drive controller as claimed in claim 5, wherein said frequency generator includes an electrical print coil system.

7. The motor drive controller as claimed in claim 6, wherein said position detector includes at least two hall elements secured to the motor by soldering.

8. A motor drive controller for controlling rotation of a magnetic rotor of a motor by flowing periodic current through coils of plural phases, said motor drive controller comprising:
   a position detector configured to detect and output positional signals representing rotational positions of the magnetic rotor at first resolution;
   a position change detector configured to detect and output position change signals representing positional changes of the magnetic rotor at second resolution higher than the first resolution;
   a phase synchronizing circuit configured to generate and output first pulse signals in synchronism with the position change signals;
   a phase counter configured to count the pulse signals outputted by the phase synchronizing circuit with reference to a prescribed one of the positional signals, said phase counter outputting absolute phase information representing positions of the magnetic rotor in accordance with a count value obtained by counting the pulse signals, said absolute phase information having a resolution higher than that of the positional signals; and
   a drive voltage signal outputting device configured to output a drive voltage signal flowing a prescribed level of the periodic current through the coils of the plural phases in accordance with the absolute phase information.

9. The motor drive controller as claimed in claim 8, wherein said position change signals are formed in a pulse state as second pulse signals, wherein said phase synchronizing circuit compares a phase of the first pulse signals with that of the second pulse signals at every arrival of the second pulse signals, said phase synchronizing circuit synchronizing the phase of the first pulse signals with that of the second pulse signals based on a result of the comparison of the phase synchronizing circuit.

10. The motor drive controller as claimed in claim 9, further comprising a second drive controller including:
   a velocity detector configured to detect a frequency of the position change signals generated in accordance with velocity of the magnetic rotor;

a current detector configured to detect an amount of current flowing through the coils of plural phases;

a frequency difference detector configured to detect a difference between a target frequency corresponding to a target velocity of the magnetic rotor and that detected by the velocity detector;

a target current signal generator configured to generate a target current signal for driving the motor; and a current vector controller configured to generate the drive voltage signal by executing current vector control calculation based on the absolute phase information, the target current, and the amount of current detected by the current detector.

11. The motor drive controller as claimed in claim 10, wherein said position change detector detects a velocity.

12. The motor drive controller as claimed in claim 11, wherein said position change detector includes a frequency generator.

13. The motor drive controller as claimed in claim 12, wherein said frequency generator having an electrical print coil system.

14. An image forming apparatus including a motor drive controller for controlling rotation of a magnetic rotor of a motor by flowing periodic current through coils of plural phases, said motor drive controller comprising:

a position detector configured to detect and output positional signals representing rotational positions of the magnetic rotor at first resolution;

a position change detector configured to detect and output position change signals representing rotation positional changes of the magnetic rotor at second resolution higher than the first resolution;

a phase synchronizing circuit including, a reference phase generating device configured to generate and output a series of incremental or decremented reference count values representing positions of the magnetic rotor per cycle of the positional signal, an oscillator 39 configured to generate and output oscillating pluses at prescribed resolution changed in accordance with an oscillator input thereto, a counter configured to incrementally or decrementally count the oscillating pluses outputted by the oscillator, and a phase comparator configured to compare the count values calculated by the counter with the reference count values at every generation of the positional change signals, said phase comparator outputting delay or forward information and changing the oscillator input based on a result of the comparison; and a drive voltage signal outputting device configured to output a drive voltage signal for flowing a prescribed level of the periodic current through the coils of plural phases in accordance with the count value outputted by the counter.

15. The image forming apparatus as claimed in claim 14, wherein the position detector includes at least two hall elements secured to the motor by soldering, and wherein said position change detector includes a frequency generator having an electrical print coil.

* * * * *